United States Patent
Zhai et al.

(10) Patent No.: US 8,665,794 B2
(45) Date of Patent: Mar. 4, 2014

(54) FRAME CONCATENATION IN WIRELESS UWB DEVICES

(75) Inventors: Hongqiang Zhai, Ossining, NY (US); Dong Wang, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 149 days.

(21) Appl. No.: 13/262,339

(22) PCT Filed: Mar. 8, 2010

(86) PCT No.: PCT/IB2010/050982
§ 371 (c)(1),
(2), (4) Date: Sep. 30, 2011

(87) PCT Pub. No.: WO2010/113054
PCT Pub. Date: Oct. 7, 2010

(65) Prior Publication Data
US 2012/0039255 A1     Feb. 16, 2012

Related U.S. Application Data

(60) Provisional application No. 61/165,663, filed on Apr. 1, 2009.

(51) Int. Cl.
*H04W 4/00*          (2009.01)
(52) U.S. Cl.
USPC .......................................... 370/328

(58) Field of Classification Search
USPC .................. 370/328, 470, 471, 472, 473, 474
See application file for complete search history.

(56) References Cited

U.S. PATENT DOCUMENTS

| 2003/0214930 A1 | 11/2003 | Fischer |
| 2009/0016379 A1 * | 1/2009 | Takagi et al. ................. 370/474 |

OTHER PUBLICATIONS

"Considerations on Segmentation/Concatenation in LTE", 3rd Generation Partnership Project (3GPP): Technicalspecification Group (TSG) Radio Access Network (RAN); Workinggroup 2 (WG2), XX, XX, vol. R2-060028, Jan. 9, 2006, pp. 1-5, XP003013946.
"LTE—Segmentation and Concatenation Proposal", 3rd Generation Partnership Project (3GPP); Technicalspecification Group (TSG) Radio Access Network (RAN); Workinggroup 2 (WG2), XX, XX, vol. R2-060011, Jan. 9, 2006, pp. 1-6, XP003013944.

* cited by examiner

*Primary Examiner* — Mark Rinehart
*Assistant Examiner* — Ellen A Kirillova
(74) *Attorney, Agent, or Firm* — Larry Liberchuk

(57) ABSTRACT

A method and system is provided for transmitting data frames from a first device to a second device in a wireless network. The method includes concatenating a plurality of data frames (303) into an aggregated frame (100) by the first device; transmitting the aggregated frame (100) from the first device to the second device; validating each of the plurality of data frames (303) individually by the second device; and retransmitting each of the data frames (303) that contains an error by the first device, without retransmitting the data frames that are valid.

12 Claims, 2 Drawing Sheets

| 200 | 201 | 202 | 211 | 212 | | 21N | 203 |
|---|---|---|---|---|---|---|---|
| Octets: | 1 | 1 | 2 | 2 | 2 ... | 2 | 4 |
| | Mini-Frame Count | Reserved | Length of Mini-Frame 1 | Length of Mini-Frame 2 | ... | Length of Mini-Frame N | FCS |

FRAME CONCATENATION IN WIRELESS UWB DEVICES

This application claims the benefit of U.S. Provisional Application No. 61/165,663 filed on Apr. 1, 2009.

The invention generally relates to devices in a wireless UWB (Ultra-Wideband) network and, more particularly, to a method and system which provides a new format of concatenation frames for wireless UWB devices and a new method to concatenate frames at the MAC (medium access control) layer.

The WiMedia specification (for example version 1.0) for UWB systems supports a number of different transmission (channel) rates, including 53.3 Mbps, 80 Mbps, 106.7 Mbps, 160 Mbps, 200 Mbps, 320 Mbps, 400 Mbps, and 480 Mbps. A new generation WiMedia specification, version 1.5, is being developed to allow more transmission rates of up to 1 Gbps. Expectations are that data rates will be supported up to 2 Gbps and beyond.

As the data rate increases, the total frame transmission time is shortened. However, because the transmission time of a preamble of each frame is still fixed, the transmission efficiency of a frame payload decreases. The preamble allows the receiver to acquire the wireless signal and synchronize itself with the transmitter. To improve the transmission efficiency of the frame payload, a larger frame payload size, such as 16 Kilo bytes, is used, while the maximum payload size is 4 Kilo bytes in the current specification, version 1.2 of the WiMedia specification.

With the larger frame payload size, many short frames could be aggregated into a large frame. However, in the current frame aggregation algorithm of the WiMedia specification version 1.2, an aggregated frame is completely discarded if there are any errors in the frame. Therefore, even if some of the short frames are received without errors, the entire aggregated frame has to be retransmitted. This is not desired for the scarce bandwidth of the wireless channels.

Certain embodiments of the present invention disclose a new format of concatenation frames for wireless UWB devices and a new method to concatenate frames at the MAC layer. The disclosed format uses only up to 7 bytes for each frame in the concatenation to protect the frame, as well as to indicate a transmission sequence and other control information. The disclosed concatenation approach allows validating each concatenated frame individually and, accordingly, allows for the retransmission of each concatenated frame separately if errors are found in that frame, without retransmitting the data frames that are valid. In this way, the transmission efficiency and, hence, the throughput is greatly improved.

In one embodiment of the invention, a method is provided for transmitting data frames from a first device to a second device in a wireless network. The method includes: concatenating, by a first device, a plurality of data frames into an aggregated frame; transmitting the aggregated frame from the first device to the second device; validating each of the plurality of data frames individually by the second device; and retransmitting each of the data frames that contains an error by the first device, without retransmitting the data frames that are valid.

In another embodiment of the invention, a system is provided for transmitting data frames over a wireless network. The system includes a first device configured to concatenate a plurality of data frames into an aggregated frame, transmit the aggregated frame to the second device, and retransmit each of the data frames that contains an error, without retransmitting the data frames that are valid; and a second device configured to validate each of the plurality of data frames individually.

Another embodiment of the invention provides a computer readable storage medium having stored thereon computer executable code that, when executed, causes a processor in a first device and a second device to perform the process of data frame transmission in a wireless communications network. The process includes concatenating a plurality of data frames into an aggregated frame; transmitting the aggregated frame from the first device to the second device; validating each of the plurality of data frames individually; and retransmitting each of the data frames that contains an error by the first device, without retransmitting the data frames that are valid.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
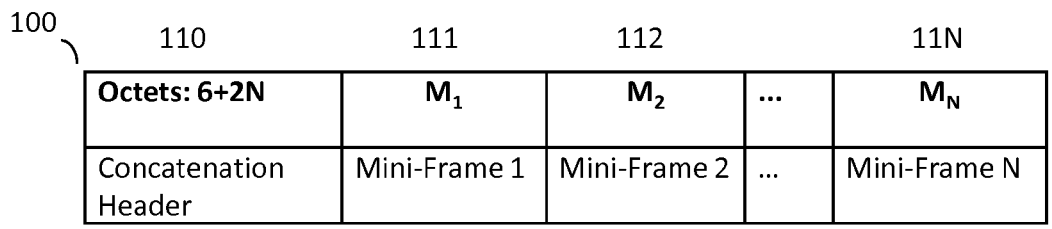
FIG. 1 illustrates a MAC frame body format for concatenated frames.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The MAC frame header may be used for identifying the data frame as a concatenated frame. For example, the frame type of the disclosed concatenated frame is defined as type 5. The frame type provided in the MAC frame header is encoded as in Table 1. The value of 5 is used to indicate to the recipient of the MAC frame header that the MAC frame is a concatenated data frame.

TABLE 1

Frame Type field encoding

| Value | Frame type |
|---|---|
| 5 | Concatenated data frame |
| 6-7 | Reserved |

A concatenated data frame includes a fixed-length MAC Header and a variable-length Payload. The MAC header fields include: protocol version, secure bit, ACK policy, frame type, frame subtype/delivery ID, retry, destination address, source address and sequence control. Table 2 shows an example of MAC Header field settings for concatenated frames.

TABLE 2

MAC Header field values for concatenated frames

| Header field | Value |
| --- | --- |
| Protocol Version | 0 |
| Secure | 0 or 1 |
| ACK Policy | No-ACK, B-ACK or B-ACK Request |
| Frame Type | 5 (concatenated frame) |
| Frame Subtype/ Delivery ID | Delivery ID |
| Retry | Reserved |
| DestAddr | DevAddr of the recipient |
| SrcAddr | DevAddr of the transmitter |
| Sequence Control | Reserved |

The length of the payload varies depending on how many data frames are concatenated. FIG. 1 illustrates the payload of a MAC frame according to an embodiment of the invention. In concatenated data frames, the payload 100 contains a concatenation header 110 and multiple mini-frames, 111, 112, . . . , 11N, where N is an integer. The number of mini-frames that can be concatenated into a MAC frame may be limited. The MAC frame body size for concatenated frames is subject to the same maximum size as any frame body.

A transmitter may concatenate multiple MSDUs (MAC service data units) with an identical Delivery ID into a single MAC frame body. A device concatenates no more than mConcatenationLimit mini-frames into a concatenated data frame. As shown in Table 3, the number of mini-frames that can be concatenated into a MAC frame may be limited by a MAC sublayer parameter, mConcatenationLimit.

TABLE 3

MAC sublayer parameters

| Parameter | Value |
| --- | --- |
| mConcatenationLimit | 63 |

Figure 2:
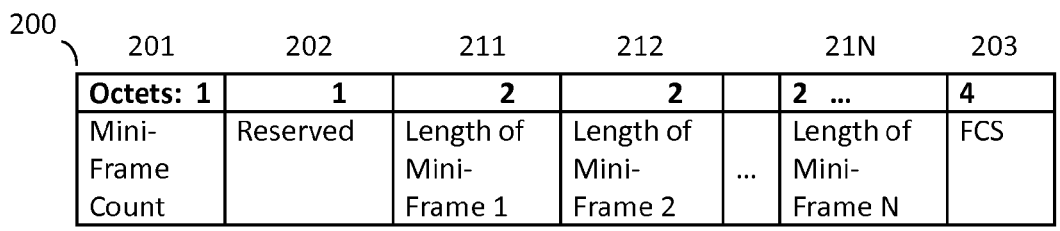
FIG. 2 illustrates a concatenation header field format.

Information about a concatenated frame may be included in a concatenation header. FIG. 2 illustrates the Concatenation Header field 200. The Mini-Frame Count field 201 contains the number of mini-frames included in the concatenated frame. The Length fields, 211, 212, . . . , 21N, in the Concatenation Header field 200 indicate the length in octets of the corresponding mini-frames. The FCS field 203 is the Frame Check Sequence (FCS) for all other fields in the Concatenation Header. The FCS field 203 contains a number that is calculated by the source node based on the data in the frame. When the destination node receives the frame, the FCS number is recalculated and compared with the FCS number included in the frame.

Figure 3:
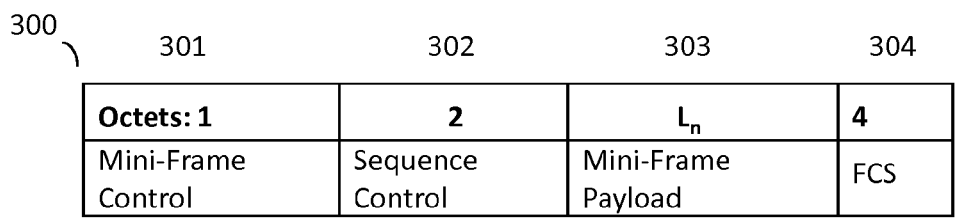
FIG. 3 illustrates a mini-frame field format.

As shown in FIG. 3, each mini-frame 300 includes a Mini-Frame Control field 301, a Sequence Control field 302, a Mini-Frame Payload 303, which includes a MSDU, and a FCS field 304. This format uses only up to 7 bytes for each frame in the concatenation to protect the frame, as well as to indicate a transmission sequence and other control information.

Figure 4:
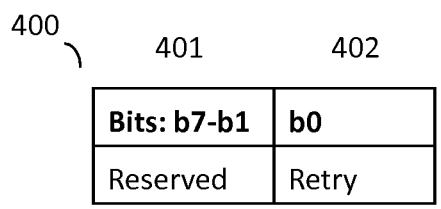
FIG. 4 illustrates a mini-frame control field format.

The Mini-Frame Control field is illustrated in FIG. 4. The b0 bit 402 of the Mini-Frame Control field 400 may be used to indicate a retry.

Turning back to FIG. 3, the Sequence Control field 302 is set as a sequence number of the frame. The FCS field 304 is the Frame Check Sequence for all other fields in the mini-frame. The FCS field 304 contains a number that is calculated by the source node based on the data in the mini-frame. In one embodiment of the invention, when the destination node receives the mini-frame, the FCS number is recalculated and compared with the FCS number included in the mini-frame. If the two numbers are different, an error is assumed, the mini-frame is discarded, and the mini-frame has to be retransmitted.

In terms of acknowledgement and retransmission, both the transmitter and receiver treat each mini-frame as different entities. On receiving a concatenated frame, the recipient sends a control frame of type B-ACK, if the ACK Policy in the MAC header of the concatenated frame is of a type B-ACK Request. In the B-ACK frame, the recipient may indicate which mini-frames are received correctly, so that the transmitter can retransmit the mini-frames that have errors. For other types of ACK Policy in the MAC header of the concatenated frame, the recipient does not respond with an acknowledgement frame.

The MAC header of the concatenated frames applies equally to each mini-frame in the concatenated frame body.

Concatenated frames may be sent as secure (S) or non-secure (N) frames, and individual data frames concatenated in the frame body have the same secure option as indicated in the MAC header. If the Secure bit in the MAC header is set to one, the Mini-Frame Payload is secured by using the secure frame format. Otherwise, the Mini-Frame Payload is the same as the MAC Frame Payload field in a normal unsecured data frame. Table 4 illustrates the security modes of the frame protection.

TABLE 4

Frame protection in a secure relationship

| Frame type of subtype | Frame protection | Meaning |
| --- | --- | --- |
| Concatenated frame | N, S | Concatenated frames may be sent as secure or non-secure frames, and individual data frames concatenated in the frame body have the same secure option as indicated in the MAC header. |

Figure 5:
FIG. 5 illustrates communication devices implemented with frame concatenation.

FIG. 5 illustrates wireless communication devices 501, 502 that are configured to implement the above protocols according to an embodiment of the invention. When device A 501 has data frames that are intended for device B 502, device A 501 concatenates the data frames into an aggregated frame and transmits the aggregated frame to device B 502. Device B 502 validates each of the data frames individually. Device A 501 retransmits only the data frames that contain an error. Device B 502 may, for example, inform Device A 501 of the received data frames that contain an error via an acknowledgment frame or via any other ACK policies.

Figure 6:
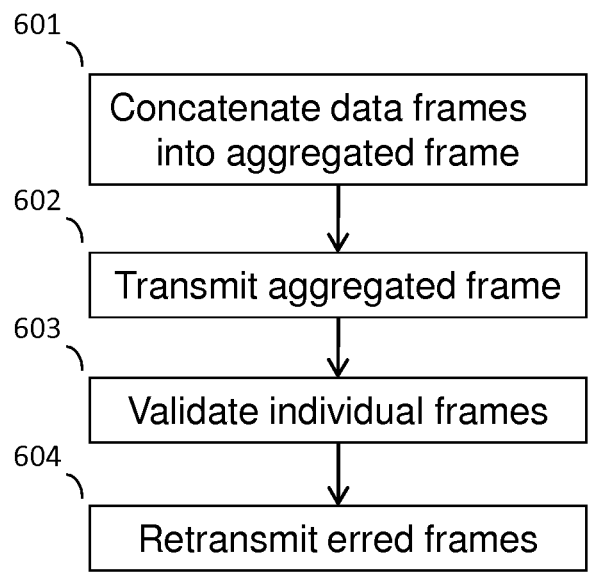
FIG. 6 illustrates a frame concatenation flow chart.

FIG. 6 shows a process flow chart of an embodiment of the invention. At 601, the first device concatenates a plurality of data frames into an aggregated frame; at 602, the first device transmits the aggregated frame to the second device; at 603, the second device validates each of the plurality of data frames individually; and at 604, the first device retransmits only the data frames that contain an error.

This invention is applicable to UWB-based WPAN and WiMedia-based Wireless Networks. It is also applicable to other wireless networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for transmitting data frames from a first device to a second device in a wireless network, comprising:
    concatenating a plurality of data frames into an aggregated frame by the first device;
    constructing the aggregated frame as a medium access control (MAC) frame;
    transmitting the aggregated frame from the first device to the second device;
    validating each of the plurality of data frames individually by the second device; and
    retransmitting each of the data frames that contains an error by the first device, without retransmitting the data frames that are valid;
    wherein the MAC frame comprises:
        a MAC header comprising a frame type to indicate that the MAC frame is a concatenated frame; and
        a payload comprising a concatenated header and a plurality of mini-frames.

2. The method of claim 1, wherein the concatenated header comprises:
    a mini-frame count,
    lengths of the plurality of mini-frames, and
    a frame check sequence for all other fields in the concatenated header;
    and wherein each of the plurality of mini-frames comprises:
        a mini-frame control field,
        a sequence control field,
        a mini-frame payload, and
        a frame check sequence for all other fields in each of the plurality of mini-frames.

3. The method of claim 1, wherein the MAC header further comprises an acknowledgment (ACK) policy, the method further comprising:
    sending a control frame of type B-ACK (bulk acknowledgment) by the second device to the first device in response to the MAC frame if the ACK policy in the MAC header is a type of B-ACK Request; and
    not sending any acknowledgment for other types of ACK policy.

4. The method of claim 1, wherein the MAC header further comprises a security option, the method further comprising:
    using the same security option as indicated in the MAC header for the plurality of mini-frames.

5. A system for transmitting data frames over a wireless network, comprising:
    a first device configured to:
        concatenate a plurality of data frames into an aggregated frame,
        construct the aggregated frame as a medium access control (MAC) frame,
        transmit the aggregated frame to a second device, and
        retransmit each of the data frames that contains an error, without retransmitting the data frames that are valid; and
    the second device configured to:
        validate each of the plurality of data frames individually,
    wherein the MAC frame comprises:
        a MAC header comprising a frame type to indicate that the MAC frame is a concatenated frame; and
        a payload comprising a concatenated header and a plurality of mini-frames.

6. The system of claim 5, wherein the concatenated header comprises:
    a mini-frame count,
    lengths of the plurality of mini-frames, and
    a frame check sequence for all other fields in the concatenated header;
    and wherein each of the plurality of mini-frames comprises:
        a mini-frame control field,
        a sequence control field,
        a mini-frame payload, and
        a frame check sequence for all other fields in each of the plurality of mini-frames.

7. The system of claim 5, wherein the MAC header further comprises an acknowledgment (ACK) policy, the second device is further configured to:
    send a control frame of type B-ACK (bulk acknowledgment) by the second device to the first device in response to the MAC frame if the ACK policy in the MAC header is a type of B-ACK Request; and
    not send any acknowledgment for other types of ACK policy.

8. The system of claim 5, wherein the MAC header further comprises a security option, the first and second devices are further configured to:
    use the same security option as indicated in the MAC header for the plurality of mini-frames.

9. A non-transitory computer readable storage medium having stored thereon computer executable code when executed causing a first device and a second device to perform a process of data frame transmission in a wireless communications network, the process comprising:
    concatenating a plurality of data frames into an aggregated frame by the first device;
    constructing the aggregated frame as a medium access control (MAC) frame;
    transmitting the aggregated frame from the first device to the second device;
    validating each of the plurality of data frames individually by the second device; and
    retransmitting each of the data frames that contains an error by the first device, without retransmitting the data frames that are valid;
    wherein the MAC frame comprises:
        a MAC header comprising a frame type to indicate that the MAC frame is a concatenated frame; and a payload comprising a concatenated header and a plurality of mini-frames.

10. The non-transitory computer readable storage medium of claim 9, wherein the concatenated header comprises:
- a mini-frame count,
- lengths of the plurality of mini-frames, and
- a frame check sequence for all other fields in the concatenated header;

and wherein each of the plurality of mini-frames comprises:
- a mini-frame control field,
- a sequence control field,
- a mini-frame payload, and
- a frame check sequence for all other fields in each of the plurality of mini-frames.

11. The non-transitory computer readable storage medium of claim 9, wherein the MAC header further comprises an acknowledgment (ACK) policy, the process further comprising:
- sending a control frame of type B-ACK (bulk acknowledgment) by the second device to the first device in response to the MAC frame if the ACK policy in the MAC header is a type of B-ACK Request; and
- not sending any acknowledgment for other types of ACK policy.

12. The non-transitory computer readable storage medium of claim 9, wherein the MAC header further comprises a security option, the process further comprising:
- using the same security option as indicated in the MAC header for the plurality of mini-frames.

* * * * *